United States Patent [19]

Sakurai

[11] Patent Number: 4,665,971
[45] Date of Patent: May 19, 1987

[54] AIR CONDITIONER SYSTEM FOR AUTOMOBILES

[75] Inventor: Yoshihiko Sakurai, Konan, Japan

[73] Assignee: Diesel Kiki Co., Ltd., Tokyo, Japan

[21] Appl. No.: 739,877

[22] Filed: May 31, 1985

[30] Foreign Application Priority Data

Jun. 4, 1984 [JP] Japan .................. 59-114069

[51] Int. Cl.⁴ .................. F24F 3/00; B61D 27/00
[52] U.S. Cl. .................. 165/22; 165/42; 165/43
[58] Field of Search .................. 165/22, 42, 43

[56] References Cited

U.S. PATENT DOCUMENTS

| 4,340,112 | 7/1982 | Sutoh et al. ............... | 165/42 X |
| 4,407,354 | 10/1983 | Takishita et al. ........... | 165/42 |
| 4,426,852 | 1/1984 | Nishimura et al. .......... | 165/43 X |
| 4,478,274 | 10/1984 | Naganoma et al. ......... | 165/42 X |
| 4,482,009 | 11/1984 | Nishimura et al. .......... | 165/43 X |
| 4,537,245 | 8/1985 | Nishimura et al. .......... | 165/43 X |

FOREIGN PATENT DOCUMENTS

| 0125562 | 11/1984 | European Pat. Off. ......... | 165/42 |
| 0136674 | 4/1985 | European Pat. Off. ......... | 165/42 |
| 2400161 | 4/1979 | France ...................... | 165/42 |
| 0004415 | 1/1982 | Japan ....................... | 165/42 |
| 0178914 | 11/1982 | Japan ....................... | 165/43 |

Primary Examiner—Albert W. Davis, Jr.
Assistant Examiner—Randolph A. Smith
Attorney, Agent, or Firm—Wenderoth, Lind & Ponack

[57] ABSTRACT

An air conditioner system for vehicles which includes at least two connecting passages interconnecting a main duct of the front-seat air conditioner unit and an air mix chamber in a duct of the rear-seat blower unit. Air mix doors are disposed in the connecting passages to adjust the amount of air introduced from the main duct through the respective connecting passages to the air mix chamber. One of the connecting passages has an inlet opening to the main duct between an evaporator and a heater core disposed in the main duct whereas the other connecting passage has an inlet opening to the main duct downstream of the heater core. Thus the amount and temperature of the air blown into a rear-seat part of the passenger compartment can be controlled independently of the temperature and the amount of the air blown into the front-seat part. With the connecting passages thus arranged, the main duct is simple in structure and hence can be manufactured more economically.

9 Claims, 9 Drawing Figures

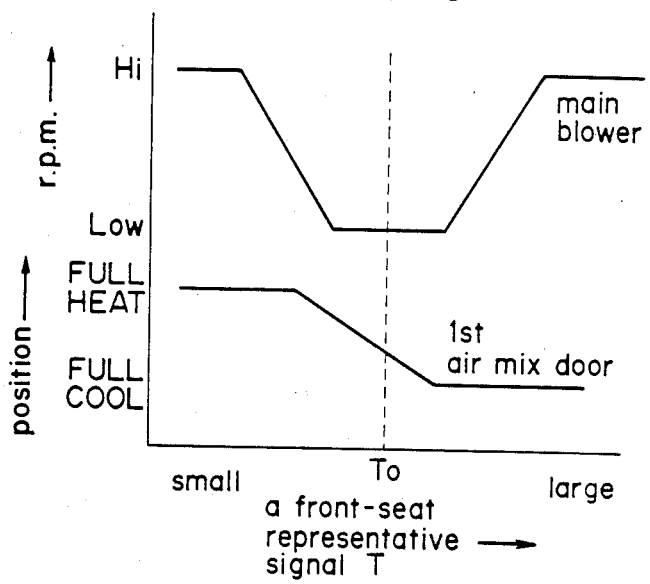
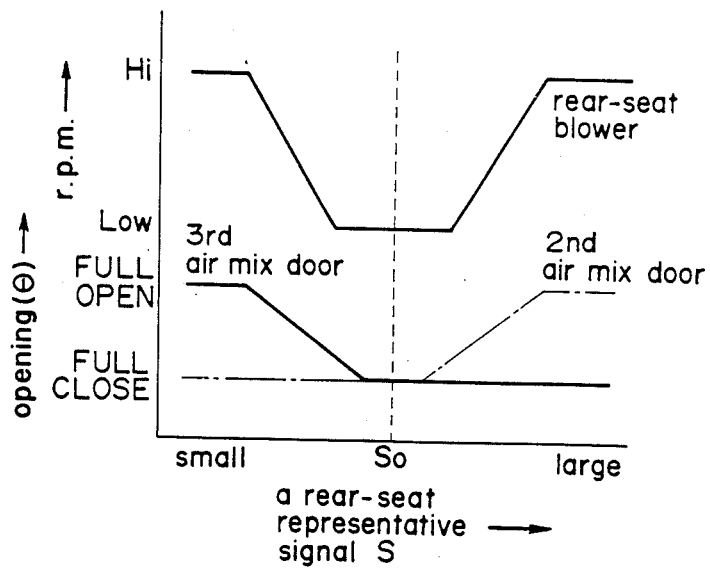

AIR CONDITIONER SYSTEM FOR AUTOMOBILES

BACKGROUND OF THE INVENTION

1. Field of the invention

The present invention relates to air conditioner systems for automotive vehicles, and more particularly to air conditioner systems capable of controlling the amount and temperature of the blown-out air for a rear-seat part separately from the amount and temperature of the blown-out air for a front-seat part of the vehicle passenger compartment.

2. Related Art

As shown in Japanese Utility Model laid-open Publication No. 57-97013, it is conventional practice to dispose two separate air conditioner units on a front-seat part and a rear-seat part, respectively, of the vehicle passenger compartment. The disclosed system is disadvantageous in that the front air conditioner unit is substantially useless in conditioning the rear-seat side and the air conditioner system is wasteful as a whole.

In order to eliminate the foregoing drawback, there have been proposed air conditioner systems such as shown in Japanese Patent Publication No. 58-7486 and the Japanese Patent Laid-Open Publication No. 57-167819. The former Publication shows a front-seat air conditioner unit which comprises at least one partition wall disposed in a main duct downstream of an evaporator so as to define a plurality of chambers or passages in which heater cores are disposed with air mix doors provided in front of the respective heater cores. The latter publication discloses a system wherein a heater core disposed in a main duct is subdivided into two portions, two air flow passages are defined downstream of the two heater core portions by means of a partition wall, and air mix doors are provided in front of the respective heater core portions to control the temperature of air passing through the respective passages.

Both disclosed systems have main ducts subdivided into plural chambers or passages so that the ducts are complex in construction. Since the amount of air blown from outlets of the duct reduces as the number of passages increases, an insufficient amount of air is blown into the rear-seat part when a large amount of air is blown into the front-seat part. Thus a difficulty arises in that proper control of the amount of blown-out air is difficult to achieve.

SUMMARY OF THE INVENTION

It is accordingly an object of the present invention to provide an air conditioner system for vehicles which has an improved duct which is simple in structure and which can adjust the amount of the blown-out air for a front-seat part and the amount of the blown-out air for a rear-seat part of the passenger compartment independent of each other.

According to the present invention, there is provided an air conditioner system for vehicles, comprising: a front-seat air conditioner unit including a main duct, a main blower disposed in said main duct for forcing air therethrough, an evaporator disposed in said main duct downstream of said main blower, and a heater core disposed in said main duct downstream of said evaporator; a rear-seat blower unit including a rear-seat duct and a rear-seat blower disposed in said rear-seat duct for forcing air therethrough, said rear-seat duct including an air mix chamber defined upstream of said rear-seat blower; at least two connecting passages interconnecting said main duct and said air mix chamber, one of said connecting passages having an inlet opening to said main duct between said evaporator and said heater core, the other connecting passage having an inlet opening to said main duct downstream of said heater core; and means for adjusting the proportion of air introduced from said main duct through said connecting passages into said air mix chamber.

With the connecting passages thus arranged, the front-seat air conditioner unit and the rear-seat blower unit can be connected together without the necessity of reconstruction of the main duct. The duct per se is simple in structure. Furthermore, the amount of blown-out air for the rear-seat part can be adjusted independently from the amount of blown-out air for the front-seat part.

Many other advantages and features of the present invention will become manifest to those versed in the art upon making reference to the detailed description and the accompanying sheets of drawings in which preferred structural embodiments incorporating the principles of the present invention are shown by way of illustrative example.

BRIEF DESCRIPTION OF THE DRAWINGS

FIG. 6 is a graph illustrative of the controlling performance of a main blower and a first air mix door with respect to front-seat representative signal values T;

FIG. 7 is a graph illustrative of the controlling performance of a rear-seat blower and a second air mix door with respect to rear-seat representative signal values S;

DETAILED DESCRIPTION

The present invention will now be described in detail with reference to the illustrated embodiments.

Figure 1:
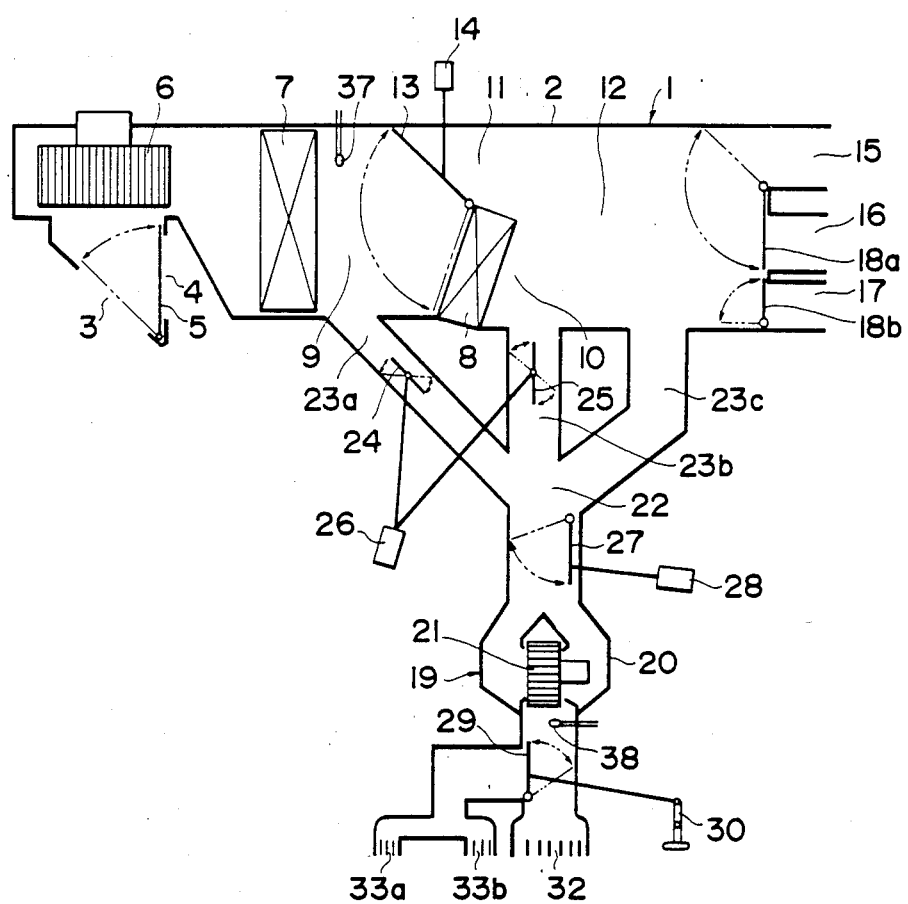
FIG. 1 is a schematic view of an embodiment of an air conditioner system according to the present invention.

Referring to FIG. 1, there is shown a first embodiment of an air conditioner system according to the present invention. The air conditioner system comprises a front-seat air conditioner unit 1 including a main air flow duct 2 which has a recirculated air inlet 3 and an outside air inlet 4 provided in branched fashion. A door 5 is provided between the branched inlets 3 and 4 to select one of the inlets 3, 4.

A main blower 6 is disposed in the main duct 2 immediately downstream of the inlets 3, 4 to force air through the duct 2 from the recirculated air inlet 3 or the outside air inlet 4. An evaporator 7 and a heater core 8 are successively disposed downstream of the air blower 6 the main duct 2. The evaporator 7 forms a refrigerant system together with a compressor and other related components (which are not shown) and cools the air passing therethrough. The cooled air then flows through a cool air passage 9 defined downstream of the evaporator 7. The heater core 8 is incorporated in a hot water system, not shown, in which engine cooling water circulate, and heats the air passing therethrough. The heater core 8 is disposed in a hot air passage 10 extending from the cool air passage 9 along one side of the main duct 2. A bypass-passage 11 extends from the cool air passage 9 in parallel relation to the hot air passage 10 to bypass the heater core 8. The hot air passage 10 and the bypass passage 11 are blended at a main air mix chamber 12 where the air passed through these passages 10, 11 are mixed together to control the temperature of the air to be discharged or blown-out from the duct 2 at a desired value.

A first air mix door 13 is disposed in front of the heater core 8 for controlling the ratio of the amount of air passing through the heater core 8 to the amount of air passing through the bypass passage 11. The first air mix door 13 is operatively controlled by a first actuator 14 to move between a full heat position in which the air passes solely through the heater core 8, and a full cool position in which all the air bypasses the heater core 8. Accordingly, the temperature of the air thus mixed in the air mix chamber 12 can be adjusted at a desired value depending on the position of the first air mix door 13.

The temperature controlled air is discharged into a front-seat part of the vehicle passenger compartment (not shown) through a front upper outlet or a vent outlet 15, a front lower outlet or a heater outlet 16 and a defroster outlet 17. A door 18a selects the upper outlet 15 or the lower outlet 16 whereas a door 18b is operable to open or block the defroster outlet 17.

The air conditioner system also comprises a rear-seat blower unit 19 including a rear-seat duct 20 and a rear-seat blower 21 for forcing air through the duct 20. The rear-seat duct 20 includes a rear-seat air mix chamber 22 disposed upstream of the blower 21. The air mix chamber 22, in the illustrated embodiment, communicates with the main duct 2 through first to third connecting passages 23a–23c. The first connecting passage 23a has an inlet opening to the cool air passage 9 defined between the evaporator 7 and the heater core 8. The second and third connecting passages 23b, 23c have inlets, respectively, opening to the main duct 2 downstream of the heater core 8. Stated more specifically, the inlet of the second connecting passage 23b opens to an end portion of the hot air passage 12 adjacent to the main air mix chamber 12 whereas the inlet of the third connecting passage 23c opens to a position immediately downstream of the main air mix chamber 12.

Disposed respectively in the first and second connection passages 23a, 23b are second and third air mix doors 24, 25 for adjusting the amount of air passing through the passages 23a, 23b depending on the openings of the doors 24, 25. The doors 24, 25 are operated by a second actuator 26. Disposed between the rear seat air mix chamber 22 and the blower 21 is a rear-seat shutter 27 which is adapted to be operated by a third actuator 28 to move from an open position to a closed position in response to an output signal from a passenger sensor, not shown, thereby preventing air flow from the front-seat air conditioner unit 1 to the rear-seat part when there is no passenger in the rear-seat.

Figure 2:
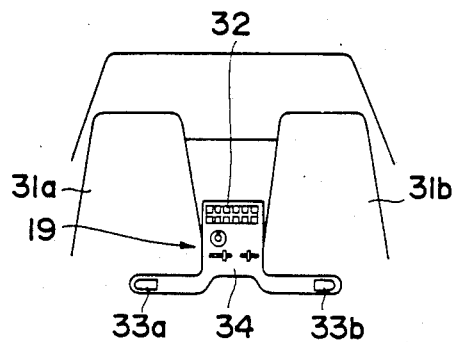
FIG. 2 is a schematic front elevational view showing a rear-seat blower unit installed in a vehicle passenger compartment.
Figure 3:
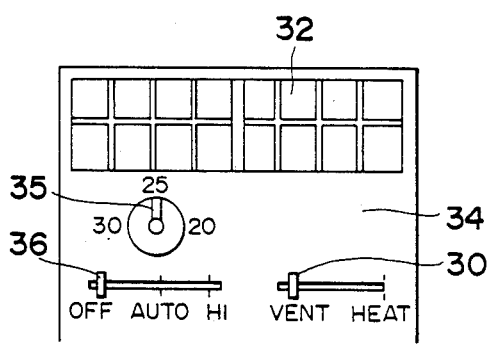
FIG. 3 is a schematic front elevational view showing an instrument panel of the rear-seat blower unit shown in FIG. 2.

The rear-seat duct 20 is bifurcated into two branch duct portions of a position downstream of the blower 21. A rear-seat mode door 29 is disposed between the bifurcated branch duct portions and is connected to a mode lever 30 for selecting one of the duct portions, namely the mode of blown-out air. As shown in FIG. 2, one of the branch duct portions has a central vent outlet 32 opening to the rear-seat part of the passenger compartment, the vent outlet 32 being disposed centrally between two front seats 31a, 31b. The other branch duct portion is further branched into left and right heat outlets 33a, 33b. The mode lever 30 is provided to select either the vent outlet 32 or the heat outlets 33a, 33b disposed, respectively behind the front seats 31a, 31b. The vent outlet 32, as shown in FIG. 3, is defined in an upper portion of a rear-seat instrument panel 34 on which are mounted the mode lever 30, a rear-seat temperature setter 35 for electrically setting the temperature of blown-out air for the rear-seat part, and a rear-seat air rate setter 36 for electrically setting the amount of air blown into the rear-seat part. The air rate setter 36 is moveable between an off mode position (OFF) where the rear-seat blower 21 is not in operation, an auto mode position (AUTO) where the operation of the blower 21 is automatically controlled, and a high mode position (HIGH) where the blower 21 rotates at a high speed.

In FIG. 1, reference numeral 37 denotes a first mode sensor for detecting the temperature of the air passing through the cool air passage 9 and generates an electric signal indicative of the detected temperature, and 38 denotes a second mode sensor for detecting the temperature of the air passing through the rear-seat air duct 20 and produces an electric signal indicative of the detected temperature.

Figure 5:
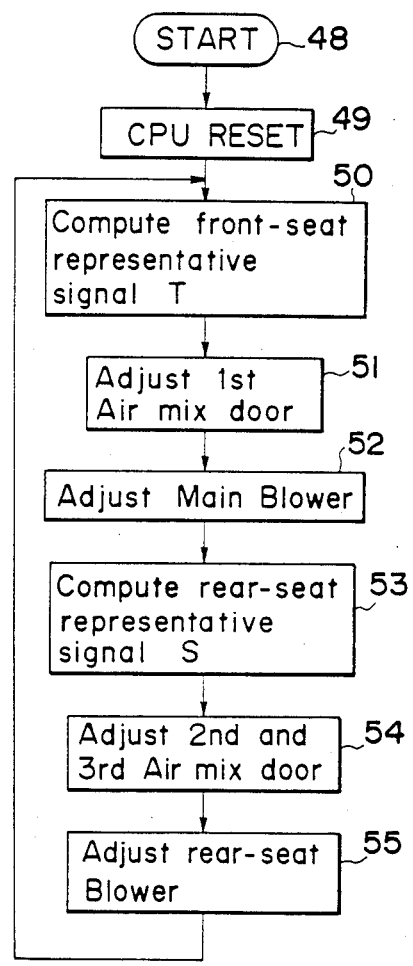
FIG. 5 is a flow chart showing the operation of a microcomputer in the electric control unit shown in FIG. 4.
Figure 4:
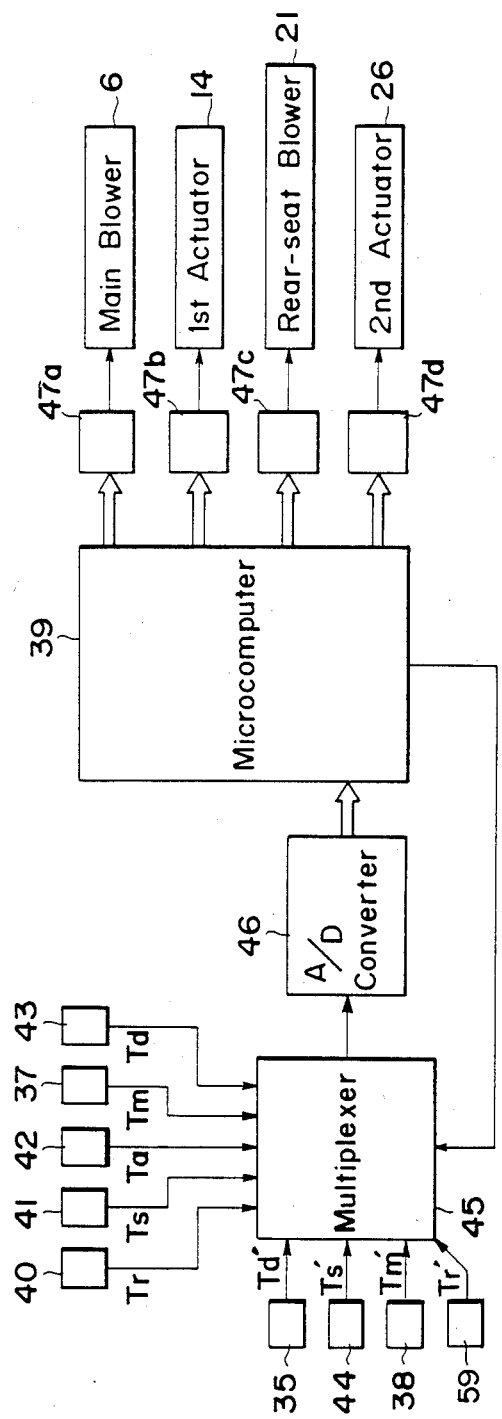
FIG. 4 is a block diagram of an electric control unit embodied in the air conditioner system of FIG. 1.

FIG. 4 shows an electric control unit for controlling the main blower 6, the first actuator 14, the rear-seat blower 21 and the second actuator 26. The electric control unit comprises a microcomputer 39 of the type known per se, including a central processing unit (CPU), a random access memory (RAM), a read only memory (ROM), input and output gates (I/O). The numeral 40 denotes a front-seat temperature sensor for detecting the temperature Tr of the front-seat part of the passenger compartment, 41 a front-seat radiant heat sensor for detecting the light quantity Ts of the sun incident to the top portion of a dashboard, for example, exposed to the incident light of the sun, 42 an outside temperature sensor for detecting the temperature Ta outside the passenger compartment, 43 a temperature setter for setting the temperature Td of the front-seat part, 44 a rear-seat radiant heat sensor 44 for detecting the light quantity Ts' of the sun incident to a rear tray, for example, and 59 a rear-seat temperature sensor for detecting the temperature Tr' of the rear-seat part of the passenger compartment. The rear-seat temperature setter 35 generates a signal indicative of the desired temperature Td' and the mode sensors 37, 38 generate electric signals, respectively, indicative of the temperature Tm, Tm'. A multiplexer 45 is responsive to a selection signal from the microcomputer 39 to sequentially deliver to an A/D converter 46 the analog signals from the sensors 37, 38, 40–42, 44 and 59 and the temperature setting means 35, 43. The A/D converter 46 converts analog signals delivered from the multiplexer 45 into digital signals and delivers the digital signals to the microcomputer 39. In accordance with a predetermined program, the microcomputer 39 computes control signals which are then supplied through driver circuits 47a-47d to the main blower 6, the first actuator 14, the rear-seat blower 21 and the second actuator 26. The operation of the microcomputer 39 is described below with reference to the flow chart shown in FIG. 5.

When a main switch is closed the microcomputer 39 is operated to start the program from a first step 48. In the next step 49, the CPU is reset to clear up its content and then the computation is started in a step 50.

In the step 50, the selection signal is delivered to the multiplexer 45 whereupon various signals indicative of the temperatures Tr, Ts, Ta, Tm and Td are inputted into the microcomputer 39 wherein a front-seat representative signal T is computed in accordance with the follwing equation.

$$T=(Tr-25)+K_1(Ts-25)+K_2(Ta-25)+K_3(Tm-Tm_0)-K_4(Td-25) \quad (1)$$

Where $K_1-K_4$ are gains of the respective sensors and setters and $Tm_0$ is a reference value of the mode sensor 37.

In the subsequent steps 51, 52, a first air mix door control signal and a main blower control signal are computed so as to bring the relation between the r.p.m. of the blower 6 and the position of the first air mix door 13 and the representative signal T obtained by the equation (1) near to those values stored in the ROM (FIG. 6). These control signals are sent to the driver circuits 47a, 47b.

In the next step 53, the selection signal is delivered to the multiplexer 45 whereupon signals indicative of the above-mentioned factors Tr', Ts', Tm' and Td' are inputted to microcomputer 39 which in turn computes a rear-seat representative signal S in accordance with the following equation.

$$S=(Tr'-25)+K_1'(Ts'-25)+K_2'(Tm'-Tm_0')-K_3'(Td'-25) \quad (2)$$

Where $K_1'-K_3'$ are gains of the respective sensors and $Tm_0'$ is a reference value of the mode sensor 38.

In the subsequent steps 54, 55, second and third air mix door control signals and rear-seat blower control signals are computed so as to bring the relation between the r.p.m. of the rear-seat blower 21 and the positions or the openings of the respective air mix doors 24, 25 and the representative signal S obtained by the equation (2) near to those values stored in the ROM (FIG. 7) These control signals are sent to the driver circuits 47c, 47d. At the end of the step 55, the computation is returned to step 50 and similar computational operations as previously mentioned are repeated.

Assuming that the thermal load of each of the front- and rear-seat parts is relatively small, the representative signals T and S are maintained substantially at the values $T_0$, $S_0$, as shown in FIGS. 6 and 7. In this condition, the main and rear-seat blowers 6, 21 rotate at relatively low speeds, the first air mix door 13 is displaced to the cool side slightly from the intermediate position thereof, and the second and third air mix doors 24, 25 are held in the fully closed positions (indicated by chain-and-dash lines in FIG. 1). Thus in the front-seat air conditioner unit 1, air drawn by the blower 6 is forced thereby to flow through the evaporator 7 at a lower speed where it is cooled. A portion of the cooled air passes through the heater core 8 while the remainder of the air flows through the bypass passage 11 into the main air mix chamber 12 where the cooled and heated air is mixed together at a desired temperature value.

The temperature controlled air is finally blown into the front-seat part of the passenger compartment from at least one of the outlets 15-17 selected by the mode doors 18a, 18b.

In the rear-seat blower unit 19 with the second and third air mix doors 24, 25 fully closed, air is allowed to flow through the third connecting passage 23c into the air mix chamber 22 and blown into the rear-seat part of the passenger compartment from each of the outlets 32 and 33a, 33b selected by the rear-seat mode door 29. In this condition, the temperature of the blown-out air for the front-seat part becomes equal to the temperature of the blown-out air for the rear-seat part because the third connecting passage 23c communicates with the main air mix chamber 12.

When only the rear-seat part is exposed to sunlight, the quantity Ts' detected by the radiant heat sensor 44 increases. Accordingly the representative signal S increases in accordance with the above-mentioned equation (2). This causes an increase in r.p.m. of the rear-seat blower 21 and the second air mix door 24 to move to open in response to the representative signal value. The front-seat air conditioner unit 1 remains in the above-mentioned condition. Thus the air from the main air mix chamber 12 and the cooled air passed through the evaporator 7 are mixed in the rear-seat air mix chamber 22 so that the temperature of the blown-out air is reduced while the amount of the blown-out air increases. As a result, both the temperature and the amount of blown-out air is corrected depending on the direction and the light quantity of the sunlight.

Figure 8:
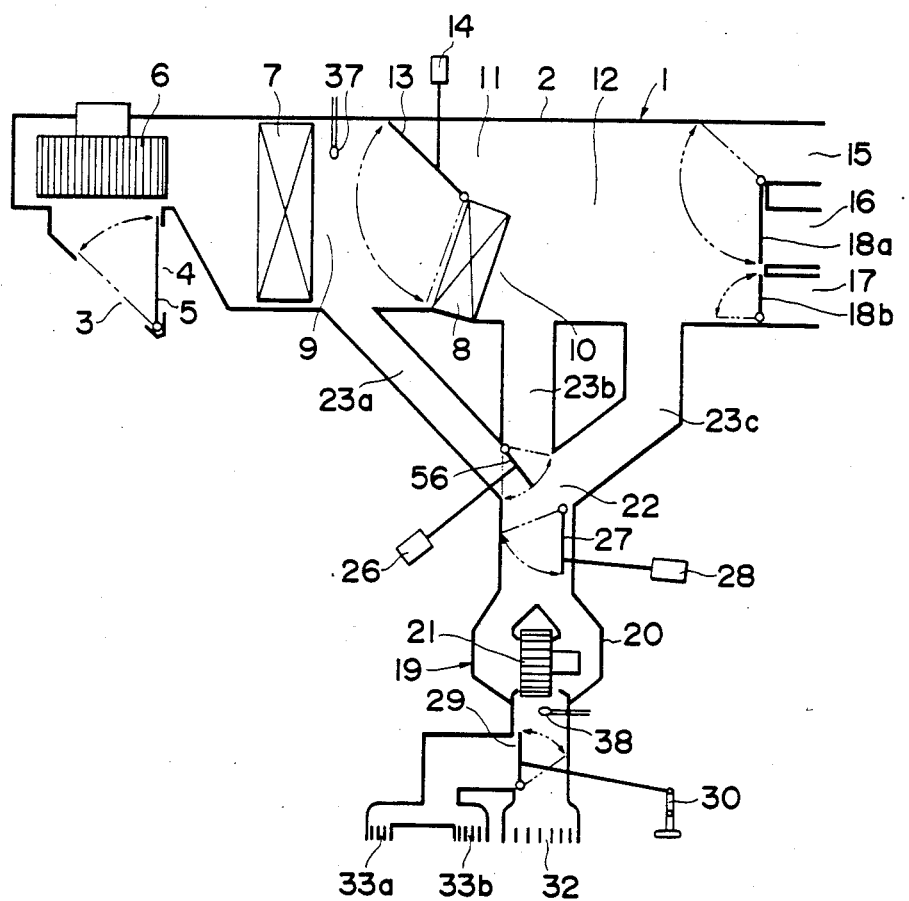
FIG. 8 is a schematic view showing another embodiment of an air conditioner system according to the invention.

FIG. 8 shows another embodiment of an air conditioner system according to the invention. This system is substantially identical with the system shown in FIG. 1 with the exception that in addition to the second and third air mix doors 24, 25, a fourth air mix door 56 is provided between outlets of the first and second connecting passages 23a, 23b. With this arrangement, the mixing of the heated air with the cooled air can be carried out with only one air mix door, resulting in a reduction in the number of structural components. In this embodiment, the third connecting passage 23c is used to introduce the air from the main air mix chamber 12 for determining a reference temperature. Such a third connection passage 23c can be omitted since air can be introduced from the main air duct 2 into the rear-seat blower unit 19 without the third connecting passage 23c. The structure and function of the system is substantially identical with the system shown in FIG. 1 and no further description thereof is needed.

Figure 9:
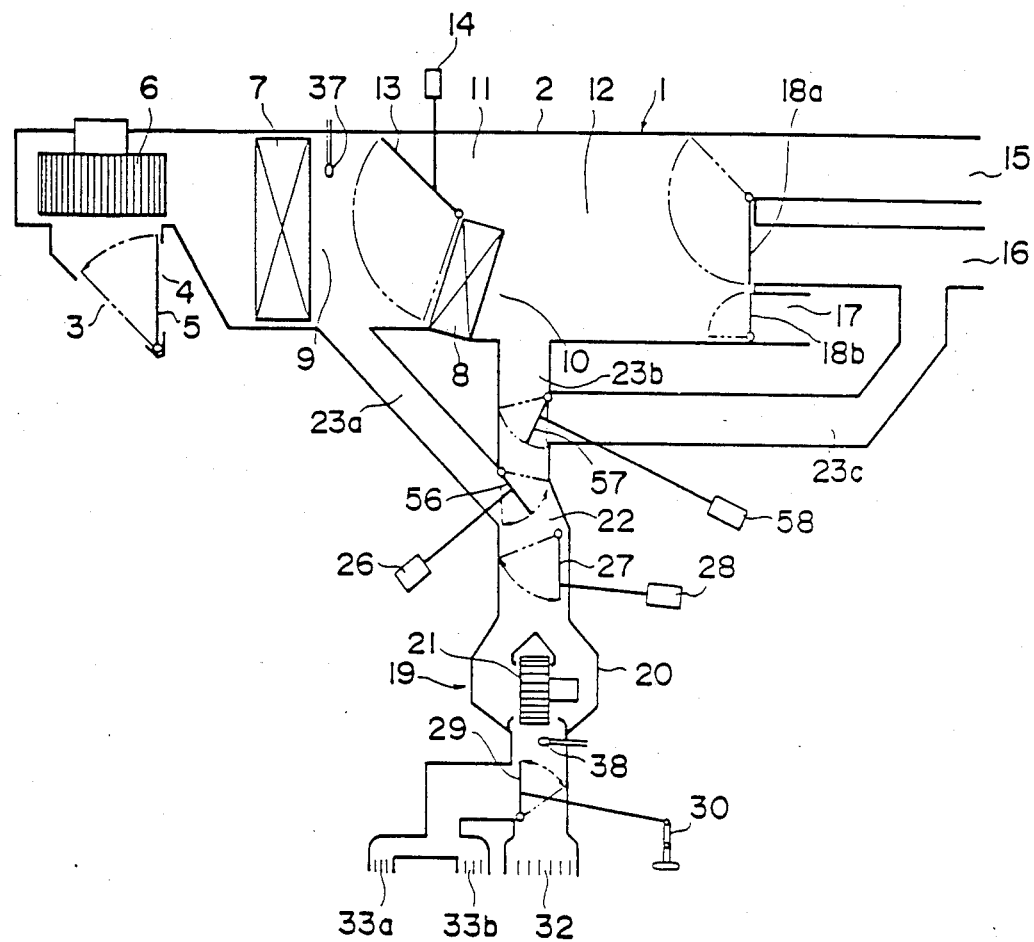
FIG. 9 is a schematic view showing a modification according to the present invention.

FIG. 9 shows a third embodiment according to the present invention. This embodiment is substantially identical with the embodiment shown in FIG. 8 with the exception that a third connecting passage 23c is provided which has an inlet opening to the front lower outlet or the heat outlet 16 of the main air duct 2, and an outlet communicating with the second passage 23b with a fifth air mix door 5 disposed adjacent to the outlet to open and close the same. The fifth air mix door 57 is operated by a fourth actuator 58. Like parts are indicated by like reference numerals throughout FIGS. 1, 8 and 9 and no further description is necessary.

As described above, according to the present invention, the rear-seat duct includes an air mix chamber disposed upstream of the rear-seat blower, which the mix chamber is connected with the main duct by means of at least two connecting passages. One of the connecting passages opens to the main duct between the evaporator and the heater core while the other connecting passage opens to the main duct downstream of the heater core. With this arrangement, the rear-seat part of the passenger compartment can be conditioned without subdividing the main duct. Thus the duct is simple in structure and can be manufactured more economically. The rear-seat blower unit has the blower controlled independently from the main blower of the front-seat air conditioner unit. Thus, the amount of the air blown into the rear-seat part can be controlled without causing a substantial reduction in the air blown to the front-seat part, ensuring a comfortable conditioning of the rear-seat part. The rear-seat blower promotes mixing of the heated air and the cooled air in the rear-seat air mix chamber such that the air blown into the rear-seat part is at a constant temperature.

What is claimed is:

1. An air conditioner system for a vehicle including a passenger compartment having a front-seat part and a rear-seat part, said air conditioner system comprising:
   (a) a front-seat air conditioner unit including a main duct having a plurality of front outlets connecting said main duct to said front-seat part, a blower disposed in said main duct for forcing air therethrough to said front-seat part, an evaporator disposed in said main duct between said main blower and said front outlets, and a heater core disposed in said main duct between said evaporator and said front outlets;
   (b) a rear-seat blower unit including a rear-seat duct having a plurality of rear outlets connecting said rear-seat duct to said rear-seat part and a rear-seat blower disposed in said rear-seat duct for forcing air therethrough to said rear-seat part, said rear-seat duct including an air mix chamber, said rear-seat blower being between said air mix chamber and said rear outlets;
   (c) at least two connecting passages interconnecting said main duct and said air mix chamber, one of said connecting passages having an inlet opening into said main duct between said evaporator and said heater core, the other connecting passage having an inlet opening into said main duct between said heater core and said front outlets; and
   (d) means for adjusting the proportion of air introduced from said main duct through said connecting passages into said air mix chamber.

2. An air conditioner system according to claim 1, wherein said adjusting means comprises air mix doors, respectively disposed in said connecting passages.

3. An air conditioner system according to claim 1, said connecting passages having respective outlets opening to said mix chamber, said adjusting means comprising an air mix door disposed between said outlets to selectively close one of said outlets.

4. An air conditioner system according to claim 1, wherein said main duct includes a hot air passage extending from said heater core towards said front outlets, and a bypass passage extending parallel to said hot air passage to bypass said heater core, said hot air passage and said bypass passage being joined together at a main air mix chamber disposed in said main duct between said heater core and said front outlets, said inlet of said other connecting passage opening into said hot air passage.

5. An air conditioner system according to claim 4, including a further connecting passage communicating said main duct with said air mix chamber, said further connecting passage having an inlet opening into said main duct, said inlet opening of said other connecting passage being between said heater core and said inlet opening of said further connecting passage.

6. An air conditioner system according to claim 5, wherein said inlet opening of said further connecting passage opens into said main air mix chamber.

7. An air conditioner system according to claim 5, said further connecting passage having an outlet opening to said other connecting passage, said adjusting means further including an air mix door disposed adjacent to said outlet of said further connecting passage.

8. An air conditioner system according to claim 7, said inlet of said further connecting passage opening to said main air chamber.

9. An air conditioner system according to claim 7, said main duct further including at least one outlet and a door disposed between said mix chamber and said outlet to open and close the latter, said inlet of said further connecting passage disposed between said door and said outlet.

* * * * *